United States Patent
Paterra et al.

(10) Patent No.: US 8,083,046 B2
(45) Date of Patent: Dec. 27, 2011

(54) CLUTCH ASSEMBLY AND FRICTION PLATE

(75) Inventors: Daniel Paterra, Clarkston, MI (US); Donn Fairbank, Lyons, CO (US); Paul Elsesser, Glen Ellyn, IL (US); Anthony Grzesiak, Sauk Village, IL (US)

(73) Assignee: BorgWarner Inc., Auburn Hills, MI (US)

( * ) Notice: Subject to any disclaimer, the term of this patent is extended or adjusted under 35 U.S.C. 154(b) by 558 days.

(21) Appl. No.: 12/087,401

(22) PCT Filed: Jan. 3, 2007

(86) PCT No.: PCT/US2007/000110
§ 371 (c)(1),
(2), (4) Date: Jul. 3, 2008

(87) PCT Pub. No.: WO2008/054433
PCT Pub. Date: May 8, 2008

(65) Prior Publication Data
US 2009/0000899 A1    Jan. 1, 2009

Related U.S. Application Data

(60) Provisional application No. 60/759,172, filed on Jan. 13, 2006, provisional application No. 60/855,786, filed on Nov. 1, 2006.

(51) Int. Cl.
*F16D 13/64* (2006.01)
*F16D 69/02* (2006.01)

(52) U.S. Cl. ............................ 192/107 M; 192/107 R

(58) Field of Classification Search ................. None
See application file for complete search history.

(56) References Cited

U.S. PATENT DOCUMENTS

| | | | |
|---|---|---|---|
| 1,865,327 A | 6/1932 | McCain et al. | |
| 2,135,126 A | 11/1938 | Harwood | |
| 2,196,570 A | 4/1940 | Walters | |
| 3,684,062 A * | 8/1972 | Johnson | 188/251 R |
| 4,469,206 A | 9/1984 | Motomura et al. | |
| 5,878,860 A | 3/1999 | Pavangat et al. | |
| 6,135,258 A * | 10/2000 | Rommeru et al. | 192/113.34 |
| 6,138,806 A | 10/2000 | Schierling | |
| 6,415,899 B1 | 7/2002 | Gochenour et al. | |
| 6,524,681 B1 * | 2/2003 | Seitz et al. | 428/143 |
| 6,702,088 B2 | 3/2004 | Kitaori et al. | |
| 2002/0043441 A1 | 4/2002 | Fujita | |
| 2003/0150686 A1 | 8/2003 | Kremer | |
| 2004/0050646 A1 | 3/2004 | Matthes et al. | |

(Continued)

FOREIGN PATENT DOCUMENTS

EP    0267027    5/1988

(Continued)

*Primary Examiner* — David D Le
*Assistant Examiner* — Jacob S Scott
(74) *Attorney, Agent, or Firm* — Warn Partners, P.C.

(57) ABSTRACT

A friction plate is provided including ,a core plate, a core plate first friction facing having a first radius and a first height; and a core plate second friction facing having a second radius differing from the first radius and a second height differing from the first height and having a coefficient of friction differing from a coefficient of friction of the first friction facing, wherein both of the facings are formed from an integral base fiber type friction facing material and wherein the difference in coefficients of friction is due to a percentage of a friction modifying saturant in the facings and wherein there is a groove separating the facings.

12 Claims, 3 Drawing Sheets

U.S. PATENT DOCUMENTS

| | | | |
|---|---|---|---|
| 2006/0102443 A1* | 5/2006 | Kinoshita et al. | 192/70.14 |
| 2006/0124419 A1* | 6/2006 | Kinoshita et al. | 192/3.29 |
| 2007/0151822 A1 | 7/2007 | Toya et al. | |

FOREIGN PATENT DOCUMENTS

| | | |
|---|---|---|
| EP | 0704636 | 4/1996 |
| FR | 894029 | 12/1944 |
| FR | 1252818 | 2/1961 |
| FR | 1268697 | 8/1961 |
| GB | 539872 | 9/1941 |
| GB | 939720 | 10/1963 |
| GB | 944578 | 12/1963 |
| GB | 1460592 | 1/1977 |
| JP | 6329782 | 12/1988 |

* cited by examiner

CLUTCH ASSEMBLY AND FRICTION PLATE

CROSS-REFERENCE TO RELATED APPLICATION

This application is a National Stage of International Application No. PCT/US2007/000110, filed Jan. 3, 2007. This application claims the benefit of U.S. Provisional Application No. 60/759,172 filed Jan. 13, 2006 and U.S. Provisional Application No. 60/855,786 filed Nov. 1, 2006, the entire specifications of which are expressly incorporated herein by reference.

FIELD OF THE INVENTION

The field of the present invention is that of clutch assemblies and friction plates used therein. More particularly the present invention relates to clutch assemblies and friction plates used in automotive transmissions.

BACKGROUND OF THE INVENTION

In many modern automotive automatic transmissions, particularly of the design known as Lepelltier layout, a single clutch in the transmission will be required to perform its function under widely different conditions, depending on the gear ratio in which the transmission is functioning. There is a need to have good smooth engagement properties in one gear with low torque capacity requirements, and very high holding torque requirements while engaged in another gear.

SUMMARY OF THE INVENTION

To meet the aforementioned need, the present invention provides a clutch assembly having good smooth engagement properties in one gear with low torque capacity requirements, and very high holding torque requirements while engaged in another gear. The present invention additionally provides friction plates that are highly useful in such clutch assemblies.

Other features of the invention will become more apparent to those skilled in the art as the invention is further revealed in the accompanying drawings and detailed description of the invention.

DETAILED DESCRIPTION OF THE INVENTION

Figure 1:
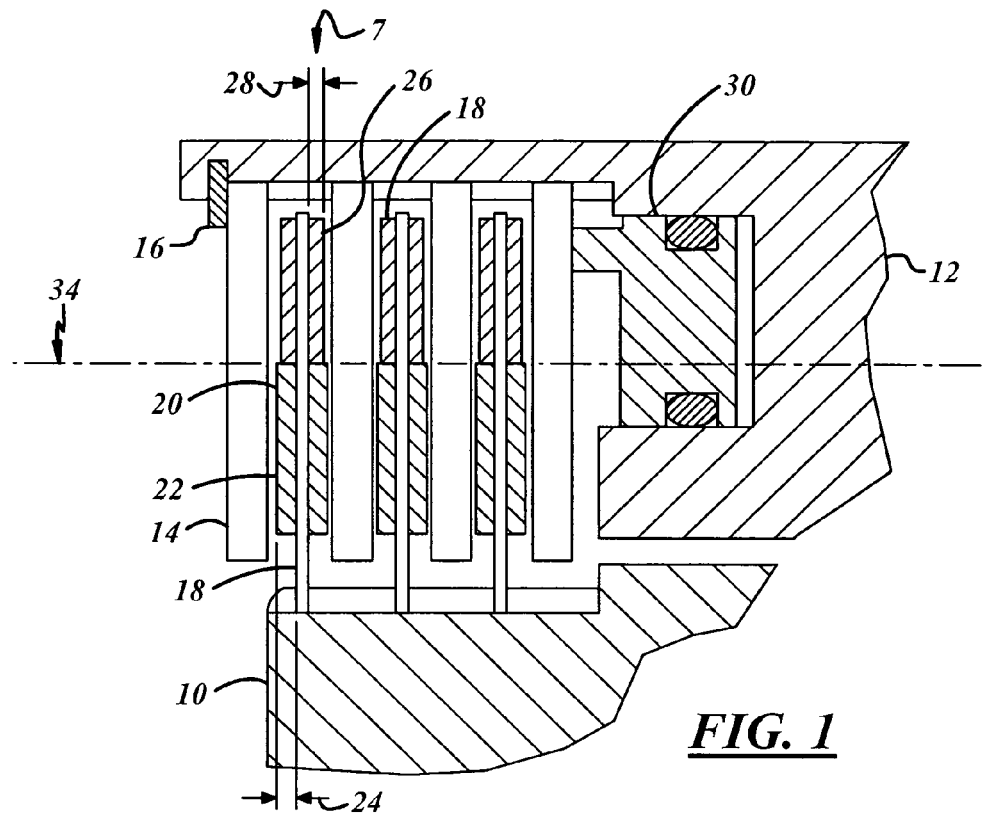
FIG. 1 is a partial sectional view of a clutch assembly of the present invention.

Referring to FIG. 1 a clutch assembly 7 of the present invention is provided. The clutch has two rotating members provided by a hub 10 and clutch housing 12. The clutch housing 12 mounts a plurality of axially moveable pressure plates 14. The pressure plates 14 have a splined connection along their outer diameter with the clutch housing 14. A snap ring 16 provides a stop for the pressure plates 14. Juxtaposing the pressure plates 14 are a plurality of friction plates 18 having their inner diameters mounted on a splined portion of the hub 10. At least one of the friction plates 18 and preferably all of them has a friction facing 20 with multiple coefficients of friction.

The friction plate 18 has a friction facing 20 with a radially inward first friction facing 22 of a first height 24 and a first coefficient of friction. The friction plate 18 also has a radially outward second friction facing 26 having a second lower height 28 and a second coefficient of friction that is higher than the first coefficient of friction.

A piston 30 mounted in the clutch housing 12 is provided for actuating the friction pack provided by the pressure plates 14 and friction plates 18. The piston 30 contacts one of the pressure plates 14 along a radially outward portion of the pressure plates 14 displaced radially outward of a radial centerline 34 of the friction plate friction facing 20.

Figure 2:
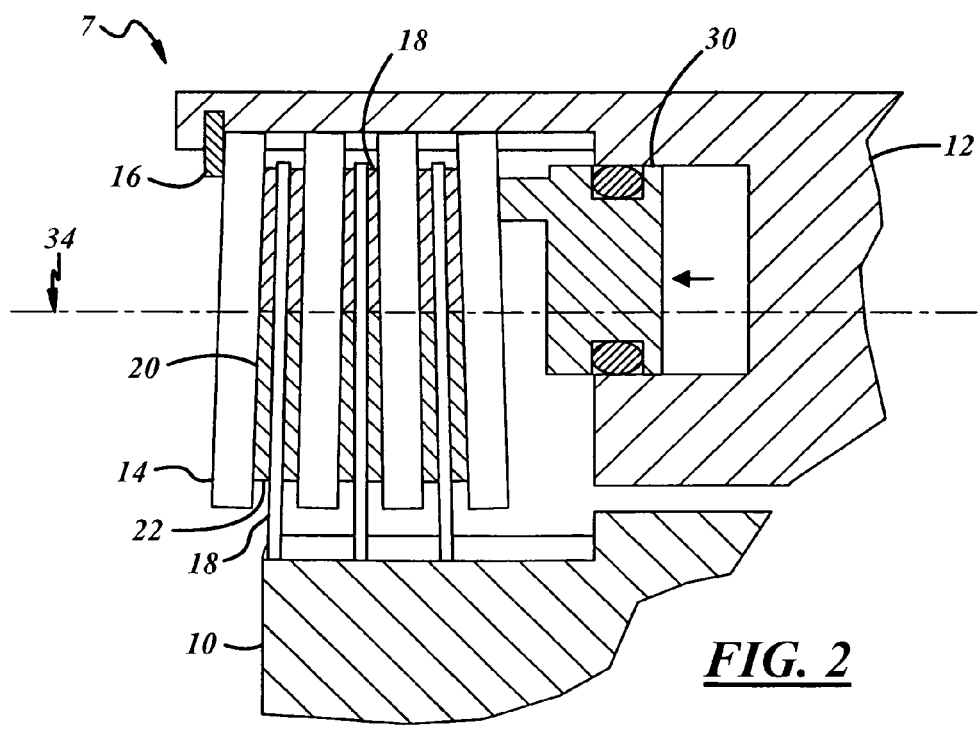
FIG. 2 is an operational view of the clutch assembly of FIG. 1.

Upon initial actuation of the piston 30, the radial inner portion of the pressure plates 14 contacts the first friction facings 22. Separation still exists between the pressure plates 14 and the second friction facings 26. Accordingly, the clutch 7 exhibits the characteristic of a clutch with smooth shifting qualities due to the first friction facing 22. Upon further actuation of the piston 30, the friction pack experiences a contracting axial deflection along its outer radial plane of rotation. The deflection will be a function of contact of the piston 30 with the pressure plates 14 outward of the of the radial centerline 34 of the friction plate facing 20 and a compression of the first friction facing 22 due to the gap with the second friction facings 26. The aforementioned deflection increases the pressure upon the first friction facing 22 compressing the same. Further pressure by the piston 30 required when the clutch 7 is in a high torque holding operation causes the second friction facing 26 to additionally be engaged by the pressure plates 14 (FIG. 2). The additional frictional engagement with the second friction facings 26 with its increased coefficient of friction greatly enhances the clutch's 7 holding torque.

Figure 9:
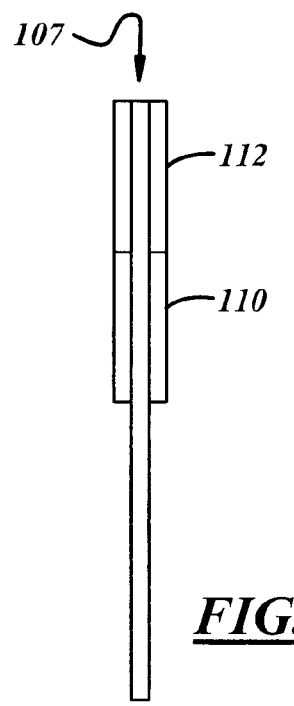
FIG. 9 is a side elevational view of an alternate preferred embodiment friction plate of the present invention.

Referring to FIG. 9, an alternate embodiment friction plate 107 is provided having a first facing 110 and a second facing 112. The first friction facing 110 and the second friction facing 112 have the same height. The second friction facing 112 has a higher coefficient of friction. When the friction plate 107 is used in clutch 7, the contracting radial deflections of the clutch assembly increases the proportion of the piston load carried by facing 112 relative to facing 110. The proportionally increased force carried by facing 112 increases the torque carrying capacity of the clutch assembly. This effect can also be enhanced by having the modulus of compression of facing 110 and 112 different with friction facing 110 having a lower modulus of compressibility (less stiff). The aforementioned facing 22 and 26 (FIGS. 1 and 2) can also have a differential modulus of compressibility contributing to the differential loading due to the contracting axial deflection.

Figure 10:
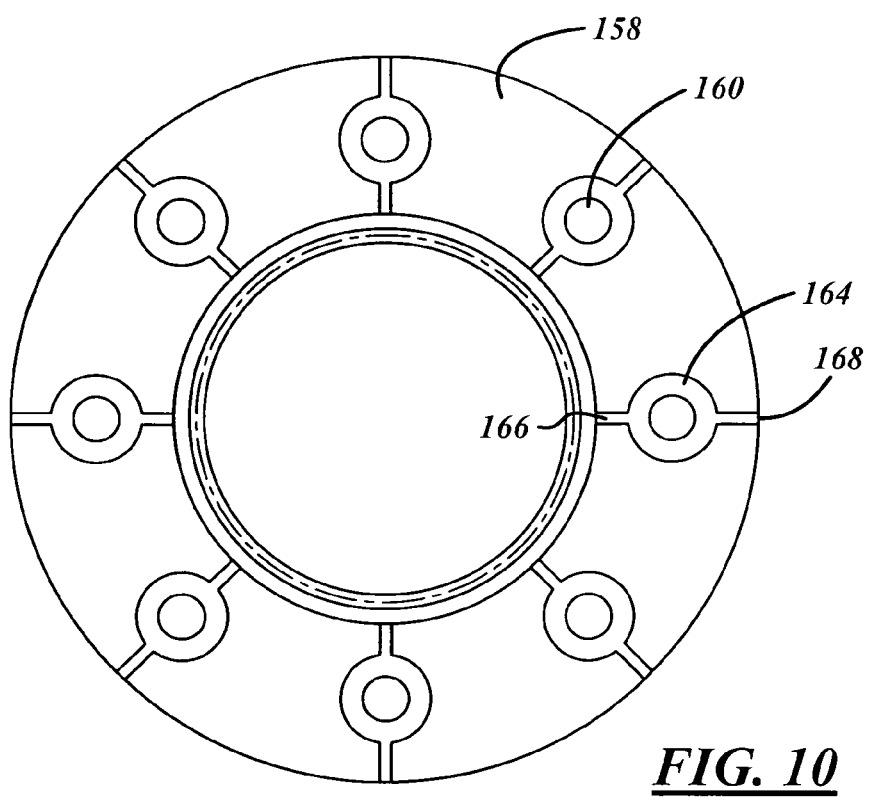
FIG. 10 is a front elevational view of an alternate preferred embodiment friction plate of the present invention.

Referring to FIG. 10, an alternate embodiment friction plate 157 is provided having a first friction facing 158 that encompasses a plurality of button second friction facings 160. The second friction facing 160 has a greater coefficient of friction and modulus of compressibility than the first friction facing 158. The second friction facing 160 has a lower height. In operation, the friction plate 157 functions in a manner to those friction plates previously described. The second friction facings 160 tend to run hotter when engaged with a pressure plate an accordingly encircled by an oil groove 164 that intersects the radial edges 166 and 168 of the facing.

Figure 3:
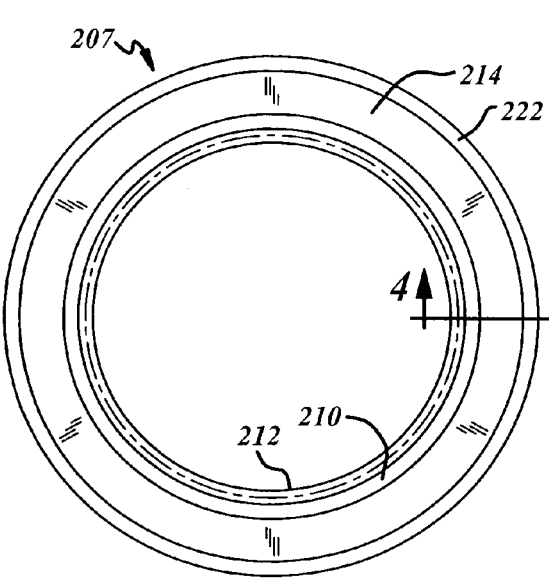
FIG. 3 is a front elevational view of a preferred embodiment friction plate of the present invention.
Figure 4:
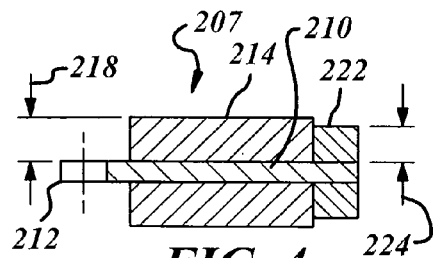
FIG. 4 is a view taken along line 4-4 of FIG. 3.

Referring to FIGS. 3 and 4, a preferred embodiment friction plate 207 useful in the clutch assembly of the present invention and other conventional clutches is shown. The friction plate 207 in the present example is a wet type friction plate. The friction plate 207 has a core plate 210. The core plate 210 is typically fabricated from carbon steel or plastic. An inner diameter of the core plate 210 has spline teeth 12 to provide a torsional interface with a drive member. In another embodiment (not shown), the core plate 210 may be connected with a torsional damper. In still another embodiment (not shown), the core plate may have spline teeth on an outer diameter.

Connected along a major continuous circumference of the core plate 210 on at least one side, and as shown both sides, is a first friction facing 214. The first friction facing 214 is typically a fiber type friction facing such as BW 1777 or BW 4300 or other suitable material. The first facing 214 typically has a static coefficient of friction in the range of 0.12 to 0.14 and a dynamic coefficient of friction in range of 0.14 to 0.16. The first facing 214 can be connected with the core 210 by adhesives or other suitable techniques. The first facing 214 can have a height 218 preferably in the range of 0.4 to 1.0 mm.

Radially separated outward from a first facing 214 and connected with the core plate 210 along a major continuous circumference is a second facing 222. The second facing 222 may be similarly fabricated as the material in the first facing 214, or of an alternate composition and fabrication, but in either case having a different coefficient of friction. In the example shown in FIG. 1 the second facing 222 has a higher static coefficient of friction in the range of 0.16 to 0.22 and a dynamic coefficient of friction in the range of 0.15 to 0.22. The second facing 222 has a height 224 preferably in the range of 0.05 mm to 0.15 less than the height 218 of the first facing 214.

Figure 6:
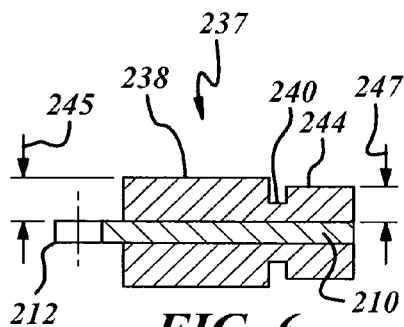
FIG. 6 is a view taken along line 6-6 of FIG. 5.
Figure 5:
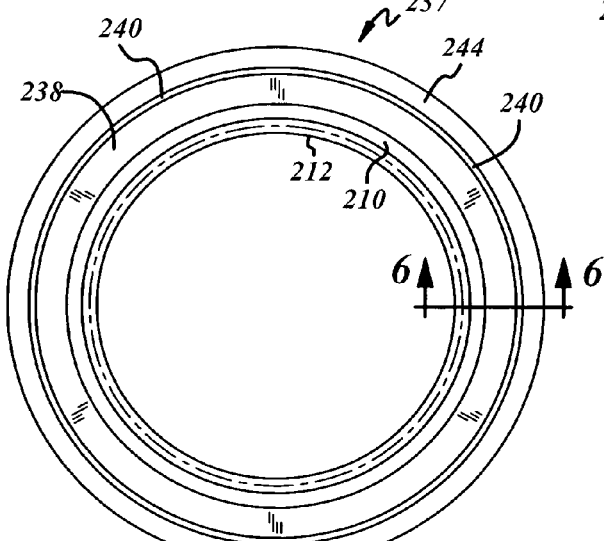
FIG. 5 is a front elevational view of an alternate preferred embodiment friction plate of the present invention.

Referring to FIGS. 5 and 6, an alternate preferred embodiment friction plate 237 has a unitary friction disc providing a first facing 238 integrally formed with a second facing 244. The first facing 238 is radially separated by a groove 240 from the second facing 244. The core plate 210 can be identical to the core plate previously described for friction plate 237. The facings 238 and 244 are fabricated from a fiber based friction material and have heights 245 and 247 comparable to those previously described. The fiber based friction material can be a fibrous material with or without various additives to modify its frictional characteristics. The second facing 244 has a higher static and dynamic coefficient of friction due to being saturated with a higher concentration of friction modifying saturant. Examples of such a saturant are phenolic, epoxy, polyimide, or silicone materials, blends thereof, or other suitable materials. Saturation levels vary from 5-60 percent by weight with higher concentrations typically enhancing friction properties. The groove 240 is provided to aid in the prevention of wicking of the saturant from the second facing 244 to the first facing 238 during fabrication. The groove 240 can be formed or milled into the facings before, after, or during connection of the facings with the core plate 210. The presence of the groove 240 allows the manufacture of friction plates with different frictional properties for different transmissions or different locations within a transmission or clutch pack using the same common materials. The specific frictional characteristics on any given friction plate can be custom selected by simply determining the saturation concentration of the separate friction facings. The saturating operation can be performed before or after connection of the facings with the core plate 210.

Figure 7:
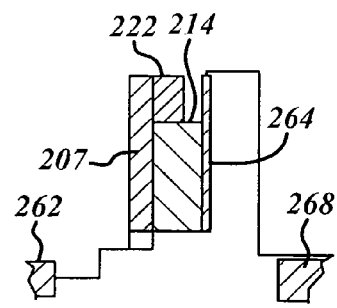
FIGS. 7 and 8 are schematic views illustrating the use of the friction plate shown in FIG. 1.
Figure 8:
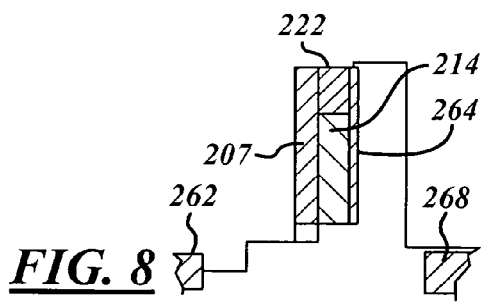

In operation (FIGS. 7 and 8), the friction plate 207 (friction facing being shown on only one side of the friction plate 207 for illustrative purposes only) is torsionally connected with a first rotating member 262. A rotating disc 264 is provided which is torsionally connected with a second shaft 68. The disc 264 and the friction plate 207 can move axially relative to one another to torsionally engage. Upon initial engagement, the disc 264 first contacts the first facing 214 without contacting the second facing 222. This above noted action allows smooth initial engagement for a gearshift operation. The increased pressure to the disc 264 compresses the first friction facing 214 to a height of the second friction facing 222 and begins to engage the second facing 222. The disc 264 then engages with both facings 214 and 222 to provide a high holding torque. Differences in the coefficients of friction, surface area, radial widths and radius of the facings 214, 222 can be specified so that either facings may transmit more torque when both facings 214, 222 are engaged with the disc 264. In most applications, the deformation of the first facing 214 should be such that under clutch engagement pressures it compresses to the facing thickness of the second facing 222. The deformation characteristics of the second facing 222 are such that as additional pressure is applied to the locked up clutch pack, the majority of the additional load is carried on the second facing 222.

While preferred embodiments of the present invention have been disclosed, it is to be understood it has been described by way of example only, and various modifications can be made without departing from the spirit and scope of the invention as it is encompassed in the following claims.

The invention claimed is:

1. A friction plate comprising:
a core plate;
a first friction facing connected with said core plate having a first radius and a first height; and
a second friction facing connected with said core plate having a second radius differing from said first radius and a second height differing from said first height and having a coefficient of friction differing from a coefficient of friction of said first friction facing; and
wherein both of said facings are formed from an integral base fiber type friction facing material and wherein said difference in coefficients of friction is due to a weight percentage of a friction modifying saturant in said facings, said saturant being taken from a group of materials including being a polyimide material, a phenolic material, an epoxy material and a silicone material and wherein there is a groove separating said facings.

2. A friction plate as described in claim 1 wherein said first height is greater than said second height.

3. A friction plate as described in claim 1 wherein said first friction facing is positioned radially inward from said second friction facing.

4. A friction plate as described in claim 1 wherein said coefficient of friction of said second facing is greater than the coefficient of friction of said first facing.

5. A friction plate as described in claim 1 wherein said saturant in said second facings is between 5-60 percent by weight.

6. A friction plate as described in claim 1 wherein a radial width of said facings differ.

7. A friction plate as described in claim 1 wherein areas of said first and second facings differ.

8. A friction plate as described in claim 1 wherein said first facing has a height in the range of 0.4 to 1.1 mm.

9. A friction plate as described in claim 1 wherein said second facings has a range of height 0.05 to 0.15 mm less than said first facing.

10. A friction plate comprising:
   a core plate;
   a first friction facing formed from a fibrous material and connected with said core plate having a first height and a first coefficient of friction; and
   a second friction facing integrally formed with the first facing and radially outward separated from the first facing by a groove, said second facing having a height less than said first height and said second facings having a coefficient of friction greater than said first coefficient of friction due to a greater weight concentration of friction modifying saturant relative to that of the fibrous material.

11. A friction plate as described in claim 10 wherein said first facing has a height in the range of 0.4 to 1.1 mm.

12. A friction plate as described in claim 10 wherein said second facings has a range of height 0.05 to 0.15 mm less than said first facing.

\* \* \* \* \*